United States Patent
Zhao

(10) Patent No.: US 7,436,094 B2
(45) Date of Patent: Oct. 14, 2008

(54) ROTARY ACTUATOR

(75) Inventor: Shen Zhao, Tokyo (JP)

(73) Assignee: Minebea Co., Ltd., Kitasaku-Gun, Nagano ( * ) Notice: Subject to any disclaimer, the term of this patent is extended or adjusted under 35 U.S.C. 154(b) by 338 days.

(21) Appl. No.: 10/551,535

(22) PCT Filed: Apr. 2, 2004

(86) PCT No.: PCT/JP2004/004866

§ 371 (c)(1),
(2), (4) Date: Sep. 30, 2005

(87) PCT Pub. No.: WO2004/091078

PCT Pub. Date: Oct. 21, 2004

(65) Prior Publication Data

US 2006/0181171 A1 Aug. 17, 2006

(30) Foreign Application Priority Data

Apr. 3, 2003 (JP) ............................. 2003-100862

(51) Int. Cl.
*H02K 21/26* (2006.01)
(52) U.S. Cl. .................... 310/154.22; 310/36
(58) Field of Classification Search ............ 310/154.01, 310/154.22, 36, 49 R
See application file for complete search history.

(56) References Cited

U.S. PATENT DOCUMENTS 4,219,825 A * 8/1980 Heyraud et al. ............. 346/101

(Continued)

FOREIGN PATENT DOCUMENTS

JP H63-249456 A 10/1988

(Continued)

OTHER PUBLICATIONS

Translation of International Preliminary Examination Report mailed Mar. 2, 2006.

(Continued)

*Primary Examiner*—Nguyen N Hanh
(74) *Attorney, Agent, or Firm*—Brinks Hofer Gilson & Lione

(57) ABSTRACT

A rotary actuator has a stator having plural permanent magnets 1a and 1b; a rotor having a rotor core 3 which plural salient poles 3a and 3b are formed at, and one or more rotor coils 5 are wound around; an electromagnetic torque generating portion A comprising the stator and the rotor which, by supplying an electric current to the rotor coils 5, generates an electromagnetic torque which displaces a relative angle position of the rotor and the stator in approximate proportion to the magnitude of the electric current; and a coil spring 36 biased in approximate proportion to the magnitude of the relative angle displacement of the rotor and the stator, and thereby generating a torque in the direction opposite to the direction of the electromagnetic torque. When the exciting current is supplied to the rotor coils 5, the electromagnetic torque in approximate proportion to the magnitude of the electric current is generated between the rotor and the stator, which makes the coil springs 36 bias and the rotor or the stator rotate to and be held at the angular position where the generated electromagnetic torque corresponds to the opposite torque generated by the coil spring 36.

11 Claims, 12 Drawing Sheets

U.S. PATENT DOCUMENTS

| | | | |
|---|---|---|---|
| 4,345,228 A | | 8/1982 | Idogaki et al. |
| 4,999,531 A | | 3/1991 | Mavadia et al. |
| 5,038,064 A | * | 8/1991 | Fiorenza .................. 310/116 |
| 5,184,893 A | | 2/1993 | Steele et al. |
| 5,749,350 A | | 5/1998 | Bender |
| 6,153,952 A | | 11/2000 | Ito et al. |
| 6,727,607 B2 | * | 4/2004 | Lee et al. .................. 310/36 |
| 7,279,815 B2 | * | 10/2007 | Lim et al. .................. 310/36 |

FOREIGN PATENT DOCUMENTS

| | | |
|---|---|---|
| JP | H06-153424 | 5/1994 |
| JP | H06-225508 | 8/1994 |
| JP | H07-046813 | 2/1995 |
| JP | H09-163708 A | 6/1997 |
| JP | H09-287485 | 11/1997 |
| JP | H10-288051 | 10/1998 |
| JP | 2000-041372 A | 2/2000 |
| JP | 2001-045719 A | 2/2001 |
| JP | 2002-209369 A | 7/2002 |
| JP | 2002-218724 | 8/2002 |

OTHER PUBLICATIONS

Supplementary Search Report issued Jun. 12, 2008 in European application No. 04725491.7.

* cited by examiner

Fig. 8A  Fig. 8B  Fig. 8C
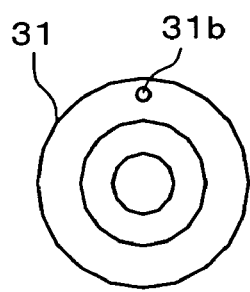
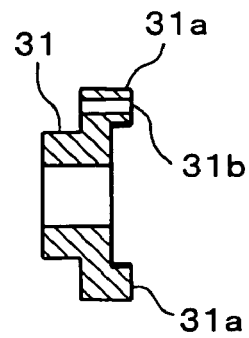
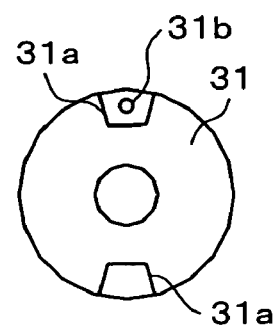
Fig. 9A  Fig. 9B
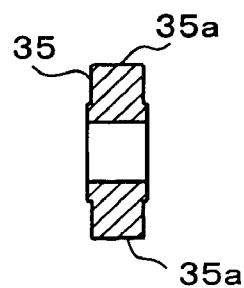
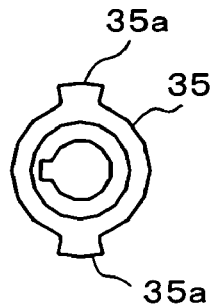

Fig.16A    Fig.16B    Fig.16C
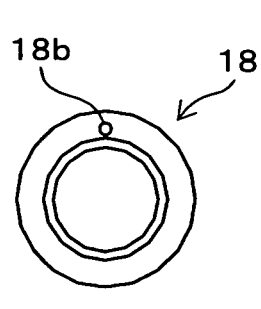 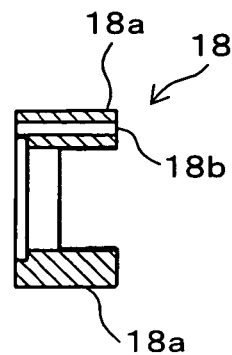 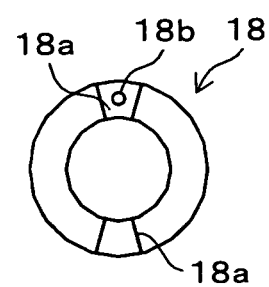
Fig.17A    Fig.17B
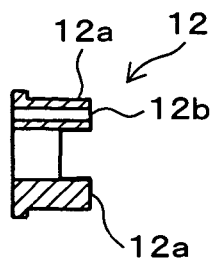 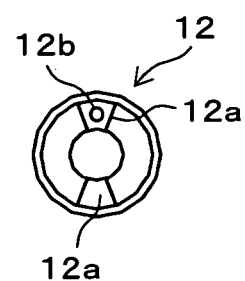
Fig.18A    Fig.18B    Fig.18C
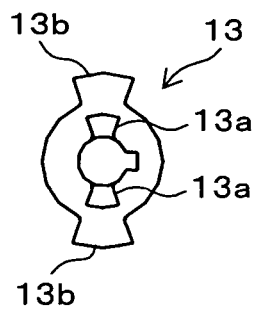 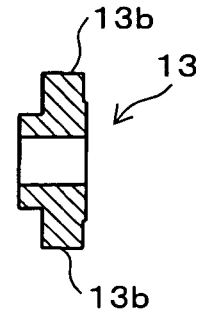 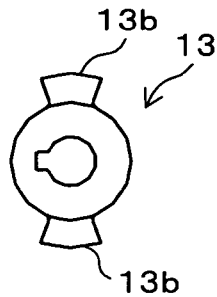

ROTARY ACTUATOR

TECHNICAL FIELD

This invention relates to a rotary actuator which is equipped with a stator and a rotor, the stator having two permanent magnets, and the rotor having a rotor core which two salient poles are formed at and one or more rotor coils are wound around. The relative angle position of the rotor and the stator thereof is displaced by supplying an electric current to the rotor coils.

BACKGROUND INFORMATION

Conventionally, for example, the amount of air sucked into an engine is controlled by adjusting the angular aperture of a butterfly valve mounted on a throttle body, which is executed by the switching drive of a DC motor. In the case, the butterfly valve on the throttle body is driven by the output torque of the DC motor, which is amplified by eleven times using a double reduction mechanism with two sets of gears, and the angular aperture of the valve is sensed using a potential angle detector composed of a thin film resistor and a set of metal brushes. However, in the case that a DC motor is used as a driver, a backlash resulted from the gears is inevitable, so that the angular aperture of the valve is difficult to be accurately controlled. Moreover, the detrimental effect on the durability, the lifetime, and the accuracy caused by the slide of the metal brushes on the surface of the thin film resistor is also inevitable in the potential angle detector.

On the other hand, to use rotary actuators, which require no gears causing a backlash, for rotation control is considered. For example, in Japanese Unexamined Patent Application No. Hei 9-163708, a rotary actuator is proposed in which a stator coil is wound around a stator core having two magnetic poles as a stator, a cylindrical rotor is provided around the stator, and two permanent magnets are secured on the internal surface of the rotor so as to face the above stator core. In this conventional technique, the thickness of both end portions of each magnet is set to be not more than 90 percent of that of the central portion. By controlling the thickness of the permanent magnets in this manner, the rotor can be reliably rotated only to two target positions without generating the opposite torque during supplying no electric current.

In the rotary actuator by the above conventional technology, the rotor stops at an initial position when not supplying an electric current, and rotates to a predetermined angular position when supplying an electric current, and returns to the initial position by the torque of the permanent magnets when the supply of an electric current is stopped. Due to this, the rotor cannot be stopped and held at any position apart from above two angular positions. Therefore, it is impossible to control the angular aperture of the valve for adjusting the above amount of the air sucked into the engine using the rotary actuator by the above conventional technology.

DISCLOSURE OF THE INVENTION

The present invention was made in consideration of the above problems, and an object of the present invention is to provide a rotary actuator with a simple structure of which the rotor and the stator can be displaced to a predetermined relative angle position in accordance with the magnitude and the conducting direction of exciting current.

The present invention provides a rotary actuator including: a stator having plural permanent magnets; a rotor having a rotor core which plural salient poles are formed at, and one or more rotor coils are wound around; an electromagnetic torque generating portion comprising the stator and the rotor which, by supplying an electric current to the rotor coils, generates an electro-magnetic torque between the stator and the rotor which displaces a relative angle position of the rotor and the stator in approximate proportion to the electric current; and an elastic member biased in approximate proportion to the amount of the relative angle displacement of the rotor and the stator, and thereby generating a torque in the direction opposite to the direction of the electro-magnetic torque.

In the above structured rotary actuator, when an exciting current is supplied to the rotor coils, an electromagnetic torque in approximate proportion to the current is generated between the rotor and the stator, which makes a relative angle displacement between the rotor and the stator. As a result, the elastic member is biased and the rotor or the stator is stopped and held at an angular position at which the generated electromagnetic torque corresponds to the repulsive torque (opposite torque) resulted from the bias of the elastic member. Therefore, since the relative angle displacement between the rotor and the stator is proportional to the magnitude of the exciting current, an arbitrary angle displacement of the rotor or the stator can be controlled by adjusting the magnitude and the direction of the exciting current, with such a simple structure that has no gears, etc., which may be used in various mechanical devices. In the present invention, although the terms "rotor" and "stator" are used, either the rotor or the stator can be arbitrarily fixed or rotated in the application of this invention.

In the above structured rotary actuator, when the direction of the supplied electric current is opposite to that of the above current, the electromagnetic torque in the opposite direction can be generated. In order to control the angular positioning of the opposite direction in addition, the actuator desirably includes: a first elastic member to which electro-magnetic torque is applied when the rotor or the stator rotates in one rotation direction; and a second elastic member to which electromagnetic torque is applied when the rotor or the stator rotates in the other rotation direction.

In the above case, if the first elastic member and the second elastic member have elastic moduli different from each other, the relative angle position of the rotor and the stator displaced by the exciting currents with the same magnitude but in different directions are different, so that the present invention can be widely applied.

The angular positioning in both directions can be realized by using a single coil spring as an elastic member. In this case, the actuator may include a first elastic member driving device rotating together with the rotor or the stator when the rotor or the stator rotates in one direction and thereby biasing the elastic member; and a second elastic member driving device rotating together with the rotor or the stator when the rotor or the stator rotates in the other direction thereby biasing the elastic member. With this feature, the rotor can bias (for example, compress) the coil spring when rotates in either direction.

Moreover, if applying a preload on the elastic member to bias it beforehand, the backlash between parts due to manufacture errors and assembly errors can be eliminated when the rotor starts rotating.

The electromagnetic torque generating portion desirably has two permanent magnets in the stator, and two salient poles formed at the rotor core; wherein the permanent, in the circumferential direction, has two end portions and one center portion, the radial thickness of the end portion being from 90% to 95% of that of the center portion, the distance from the radial outline of the center portion of the salient pole to the rotation center of the rotor core is not more than 99% of that from the radial outline of the circumferential end portion of the salient pole to the rotation center of the rotor core, and the angle between the line connecting one of circumferential outlines of a salient pole and the rotation center of the rotor core and that connecting the other circumferential outline of the same salient pole and the rotation center of the rotor core is not less than 100 degrees.

In the above structured electromagnetic torque generating portion, the generated electromagnetic torque is constant within an angular displacement range of more than 90 degrees of the rotor at a constant exciting current supplied to the rotor coils, and the magnitude of the electromagnetic torque is in proportion to the magnitude of the exciting current. When the exciting current is supplied in a direction opposite to the above, the direction of the electromagnetic torque is opposite, so that the rotor and the stator can be displaced to an arbitrary angle position within the range in accordance with the magnitude and the direction of the exciting current with a simple structure.

Following feature can be shown as a concrete structure such that the electro-magnetic torque is constant within an angular displacement range of more than 90 degrees of the rotor at a constant exciting current supplied to the rotor coils.

The rotary actuator can be structured such that the radial thickness of the circumferential end portion of the permanent magnet is smaller than that of the circumferential center portion of the permanent magnet; the distance from the radial outline of the circumferential center portion of the salient pole to the rotation center of the rotor core is smaller than that from the radial outline of the circumferential end portion of the salient pole to the rotation center of the rotor core; and the angle between the line connecting one of circumferential outlines of a salient pole and the rotation center of the rotor core and that connecting the other circumferential outline of the same salient pole and the rotation center of the rotor core is an obtuse angle.

Alternatively, the rotary actuator may be structured such that the rotor core and the permanent magnet have facing surfaces facing each other, and the facing surfaces of the rotor core and the permanent magnet are formed in the shapes of circular arc surfaces of which center positions are different from each other. The rotary actuator may be structured such that the permanent magnet has a facing surface facing the rotor core, and the facing surface is formed in the shape of an elliptical surface. The rotary actuator may be structured such that the permanent magnet has a facing surface facing the rotor core and has two circumferential end portions, and the facing surface at the circumferential end portion is formed in the shape of a flat-cut surface.

Also, the rotary actuator may be structured such that the rotor core has two facing surfaces respectively facing the two permanent magnets, and each of the facing surfaces of the rotor core is formed in the shape of a plurality of circular arc surfaces of which center positions are different from each other. The rotary actuator may be structured such that the permanent magnet has end portions in the circumferential direction, each of which has a non-magnetized region formed thereat.

BRIEF DESCRIPTION OF THE DRAWINGS

FIG. 8A to FIG. 8C are views showing a spring ring; FIG. 8A is a rear side view thereof, FIG. 8B is a longitudinal-section view thereof, and FIG. 8C is a front side view thereof.

FIG. 9A and FIG. 9B are views showing a spring driving ring; FIG. 9A is a longitudinal-section view thereof, and FIG. 9B is a front side view thereof.

FIG. 16A to FIG. 16C are views showing a peripheral spring ring; FIG. 16A is a rear side view thereof, FIG. 16B is a longitudinal-section view thereof, and FIG. 16C is a front side view thereof.

FIG. 17A to FIG. 17B are views showing an inner spring ring; FIG. 17A is a longitudinal-section view thereof, and FIG. 17B is a front side view thereof.

FIG. 18A to FIG. 18C are views showing a spring driving ring; FIG. 18A is a front side view thereof, FIG. 18B is a longitudinal-section view thereof, and FIG. 18C is a rear side view thereof.

DETAILED DESCRIPTION OF THE PREFERRED EMBODIMENTS

1. First Embodiment

A. Structure of First Embodiment

Figure 1:
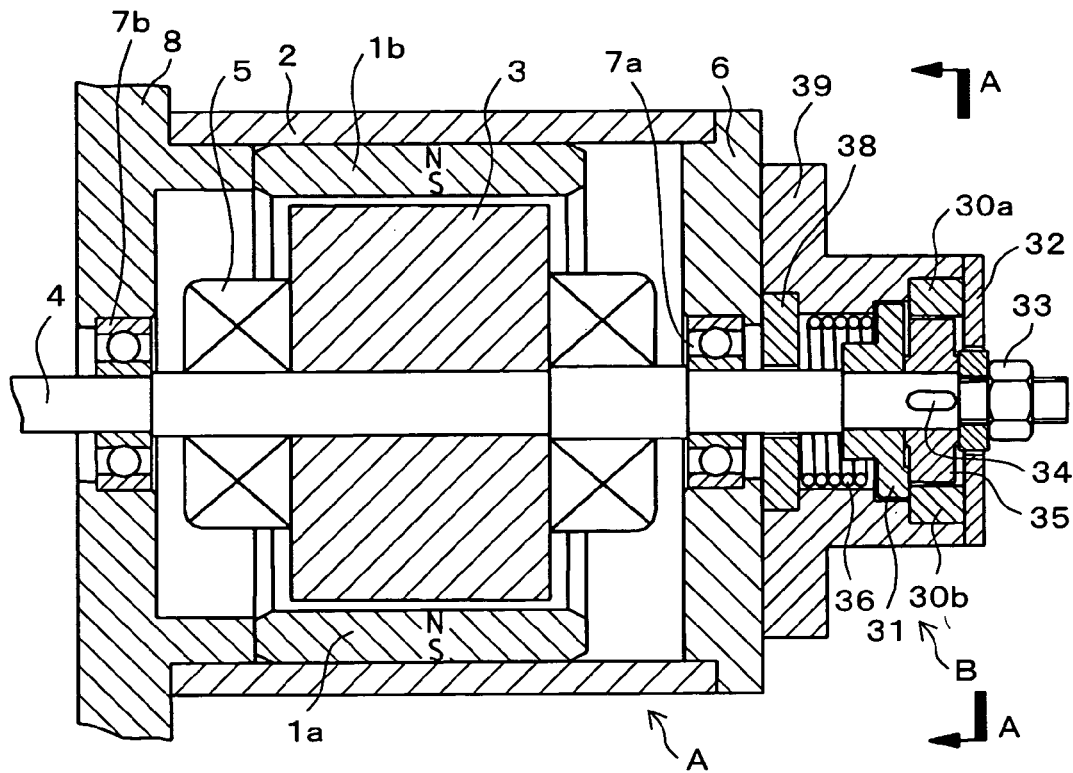
FIG. 1 is a longitudinal-section view showing a structure of a rotary actuator according to the First Embodiment of the present invention.

The First Embodiment of the invention will hereinafter be explained with reference to FIG. 1 to FIG. 10. FIG. 1 is a longitudinal-section view showing a rotary actuator according to the First Embodiment of the present invention. This rotary actuator schematically has an electromagnetic torque generating portion A and an opposite torque generating portion B. First, the structure of the electro-magnetic torque generating portion A will be explained.

In the Figures, reference numerals 1a and 1b denote two permanent magnets secured on the inner surface of a yoke 2 which is a stator. The permanent magnet 1 a has a north magnetic pole on the inside thereof and a south magnetic pole on the outside thereof (on the side facing the yoke 2). The permanent magnet 1b has a south magnetic pole on the inside thereof and a north magnetic pole on the outside thereof (on the side facing the yoke 2). A rotor core 3 has salient poles 3a, and a rotor coil 5 is wound between the salient poles 3a. A rotor shaft 4 is provided at the center of the rotor core 3. The above yoke 2 is secured on a holder 6 and a location holder 8. Bearings 7a and 7b, which rotatably hold the rotor shaft 4 penetrating the holder 6 and the location holder 8, are provided on the holder 6 and the location holder 8.

Figure 4:
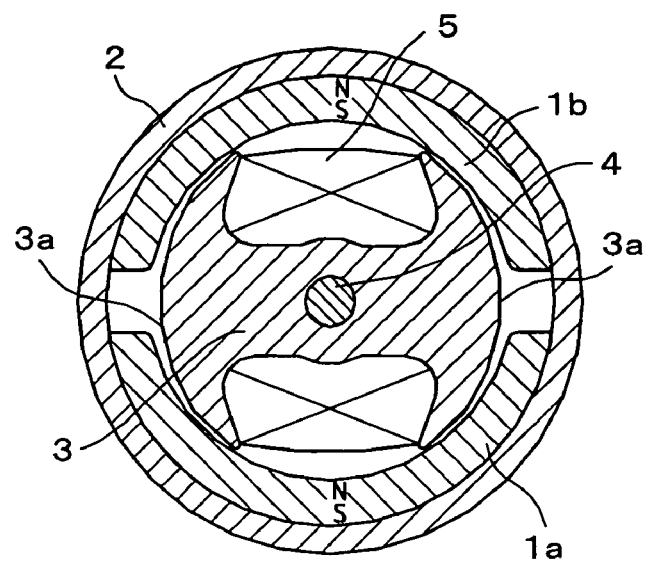
FIG. 4 is a cross-section view showing a stator in which the rotor rotates across 90 degrees from the state shown in FIG. 3 by supplying an exciting current to the rotor coils.

FIG. 4 shows a state in which an exciting current is supplied to the rotor coil 5, and the rotor core 3 rotates across 90 degrees.

Figure 5A:
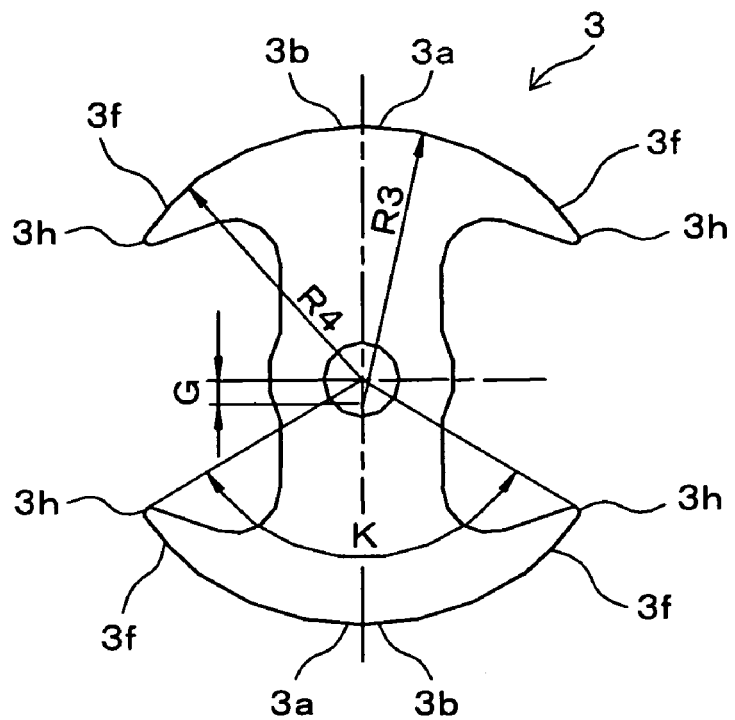
FIG. 5A is a plan view showing a structure of a rotor core.
Figure 5B:
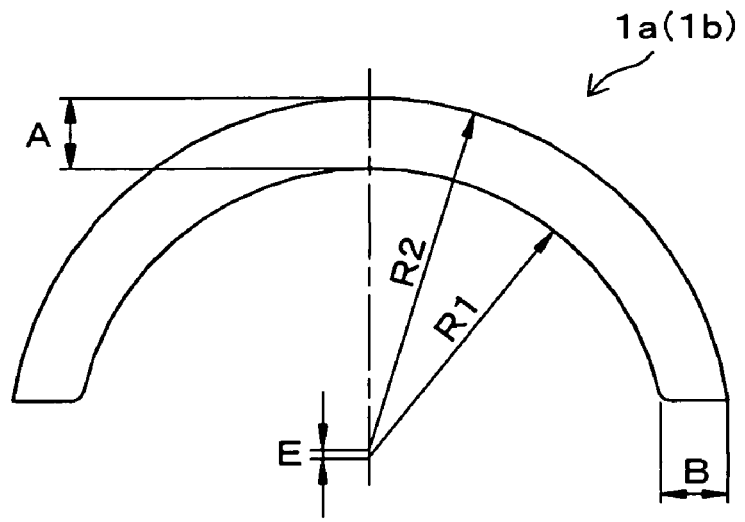
FIG. 5B is a plan view showing a structure of a permanent magnet.

FIG. 5A is a plan view showing a structure of the rotor core, and FIG. 5B is a plan view showing a structure of the permanent magnet. As shown in FIG. 5A, the salient poles 3a formed at the rotor core 3 have circular arcs 3b having radii R3 at circumferential center portion and circular arcs 3f having radii R4 at circumferential end portions. That is, the facing surfaces of the salient poles 3a which face the permanent magnets 1a and 1b are formed in the shapes of circular arcs among which the radii of the circular arcs 3b and 3f are different from each other, and a distance G exists between the center positions of the circular arcs having the radii R3 and R4. Specifically, the distance from the radial outline of the circumferential center portion of the salient poles 3a to the rotation center of the rotor core 3 is not more than 99% of that from the radial outline of the circumferential end portion of the salient pole to the rotation center of the rotor core 3. The angle K between the line connecting one of circumferential outlines 3h of the salient pole 3a and the rotation center of the rotor core 3 and the line connecting the other circumferential outline 3h of the same salient pole 3a and the rotation center of the rotor core 3 is not less than 100 degrees.

As shown in FIG. 5B, each of permanent magnets 1a and 1b has a facing surface facing the rotor which is formed by a circular arc having a radius R1, and an opposite surface facing the yoke 2 which is also formed by a circular arc having a radius R2. Between the arc centers of the facing surface and the opposite surface there exists a distance E, which makes the radial thickness B of each circumferential end portion of the permanent magnet be from 90% to 95% of the radial thickness A of the circumferential center portion of the permanent magnet.

Next, a structure of the opposite torque generating portion B will be explained.

As shown in FIG. 1, a cylindrical spring housing 39 is mounted by bolts 20 on a surface of the holder 6. A spring securing plate 38 is fixed between the spring housing 39 and the holder 6 so as to be prevented from relatively rotating. A spring ring 31 is rotatably supported by the rotor shaft 4 inside the spring housing 39.

Protrusions 31a are formed at one side of the spring ring 31 shown in FIG. 8A to FIG. 8C, which are spaced 180 degrees apart from each other, and a hole 31b penetrates through one of the protrusions 31a. Between the spring ring 31 and the spring securing plate 38 there is a space where a coil spring (elastic member) 36 is mounted. One end of the coil spring 36 is inserted in the hole 31b of the spring ring 31, and the other end thereof is inserted in the hole (not shown in the Figures) formed at the spring securing plate 38.

Figure 2:
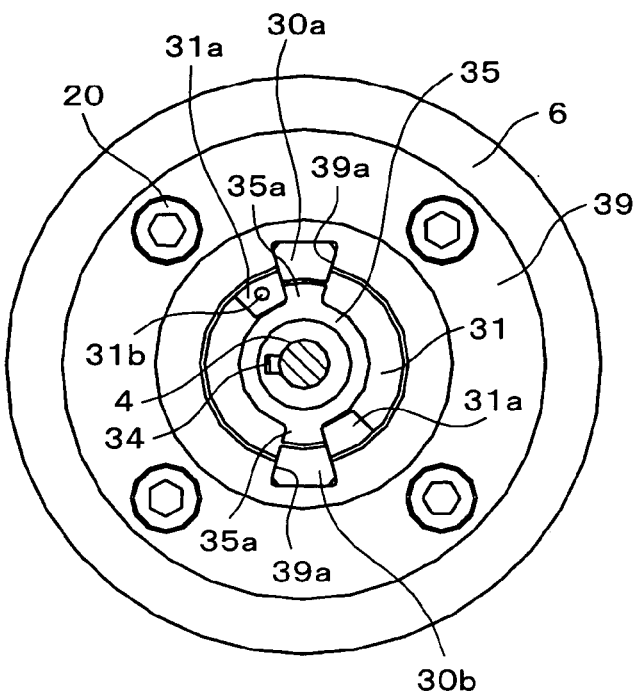
FIG. 2 is a cross-section view in the direction indicated by the arrow A-A in FIG. 1.
Figure 3:
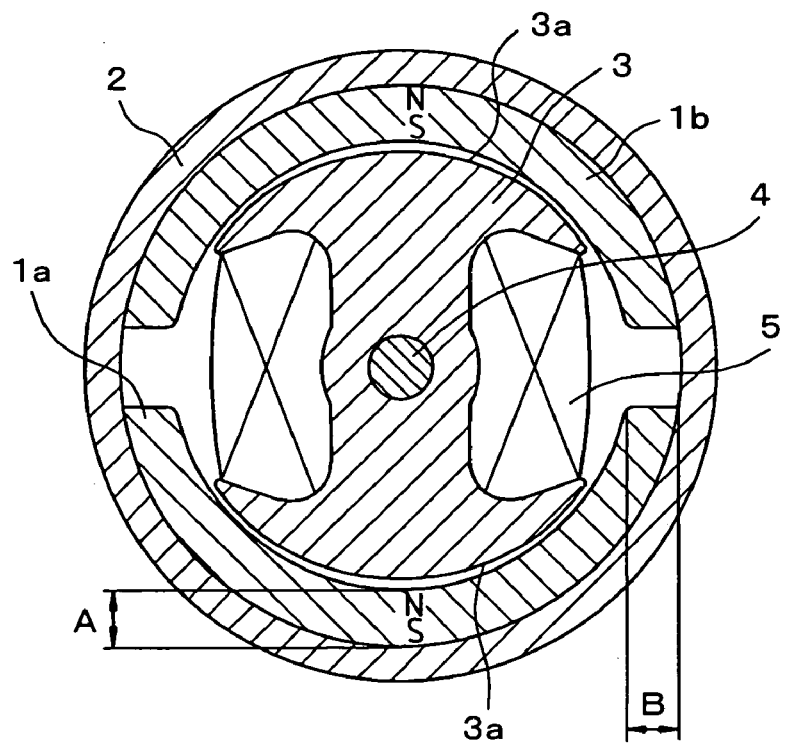
FIG. 3 is a cross-section view showing a structure of a rotary actuator according to the First Embodiment.

Two stoppers 30a and 30b adjacent to the spring ring 31 are fixed inside the spring housing 39, and spaced 180 degrees apart from each other. The stoppers 30a and 30b are fitted into dovetail grooves 39a formed on the inner surface of the spring housing 39. As shown in FIG. 2, the spring ring 31 is rotatable from the state in which the protrusion 31a goes away from the stopper 30a to the state in which the protrusion 31a contacts the other stopper 30b. With the rotation thereof, the spring ring 31 compresses the coil spring 36.

A spring driving ring 35 is mounted on the rotor shaft 4 so as to be adjacent to the spring ring 31. In the Figure, reference numeral 34 denotes a key, which prevents from the relative rotation of the rotor shaft 4 and the spring driving ring 35. Two protrusions 35a protruding in the radial direction are formed at the peripheral portion of the spring driving ring 35, and spaced 180 degrees apart from each other. Since the outside diameters between the protrusions 35a are smaller than the inside diameter between the stoppers 30a and 30b, the spring driving ring 35 is rotatable without being held by the stoppers 30a and 30b. Since the rotation locus of the protrusion 35a overlaps with that of the protrusion 31a of the spring ring 31, when the rotor shaft 4 brings the spring driving ring 35 to rotate together, the protrusion 35a of the spring driving ring 35 contacts and pushes the protrusion 31a of the spring ring 31. As a result, the spring ring 31 is driven to rotate together, and the coil spring 36 is thereby compressed.

In FIG. 1, reference numeral 32 denotes a cover, and the cover 32 is mounted to the spring housing 39 by bolts. The cover 32 prevents from the removal of stoppers 30a and 30b.

B. Action of First Embodiment

An action of the above structure of the rotary actuator will be explained hereinafter.

Figure 6:
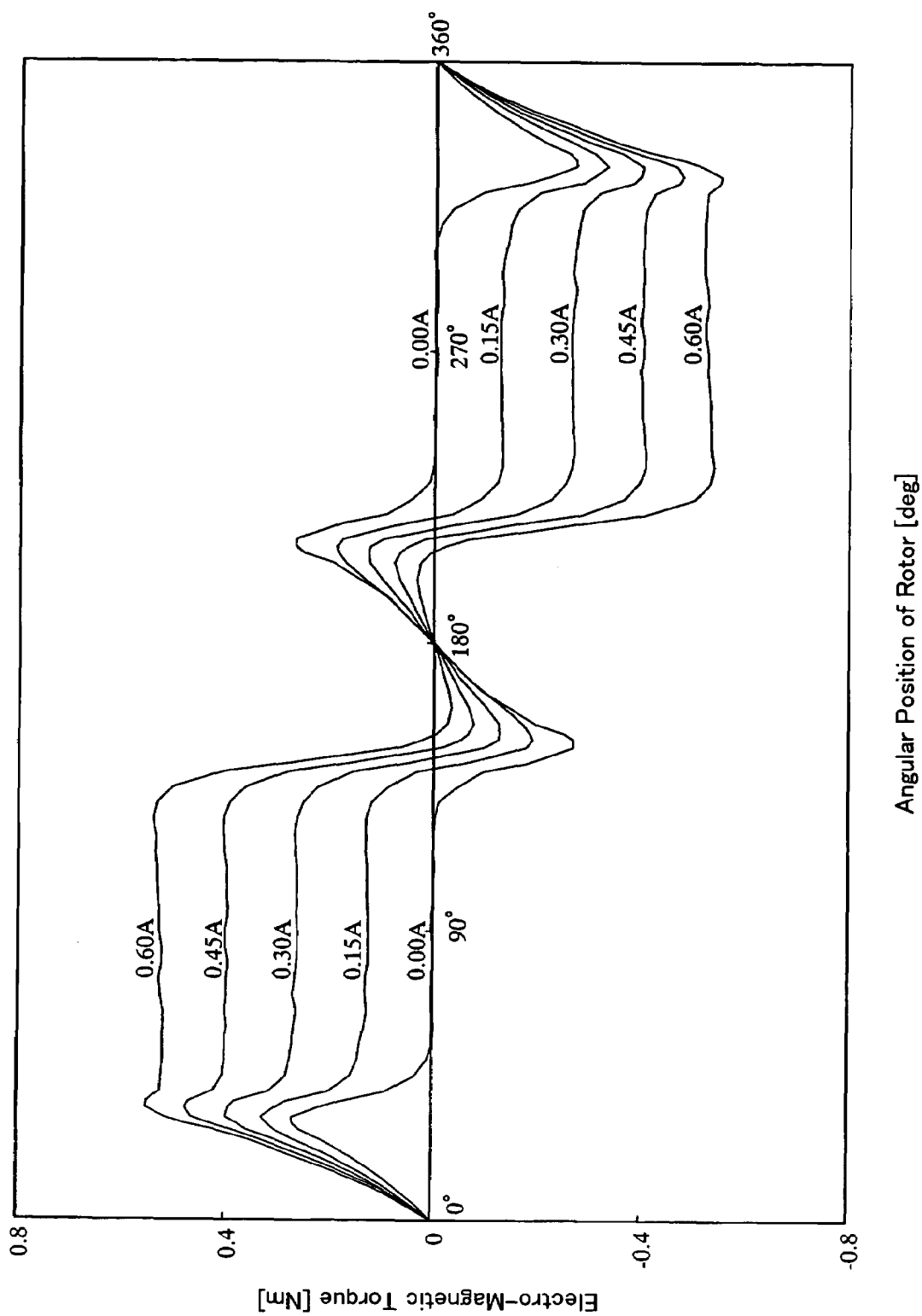
FIG. 6 is a graph showing one example of the relationship between the angular position of a rotor and the electro-magnetic torque in the case in which the magnitude of exciting current varies.

FIG. 6 is a curve diagram showing one example of the relationship between the angular position of a rotor and the electro-magnetic torque when the magnitude of an exciting current varies. As shown in FIG. 6, it is confirmed that the electromagnetic torque is constant within an angular displacement range of the rotor core 3, which is not less than 90 degrees at a constant exciting current, and the magnitude of the electro-magnetic torque is in proportion to that of the exciting current (Hereinafter, the angular displacement range is simply referred to as a "proportional range"). It is confirmed that when the exciting current is applied in the opposite direction, the electromagnetic torque is generated in the opposite direction.

In the above torque generation portion A, the radial thicknesses of permanent magnets 1a and 1b at the circumferential end portions are from 90% to 95% of the radial thicknesses of the circumferential center portions; the distance from the radial outline of the center portion of the salient poles 3a to the rotation center of the rotor core 3 are not more than 99% of that from the radial outline of the circumferential end portions of the salient pole 3a to the rotation center of the rotor core 3; and the angle between the line connecting one of circumferential outlines of a salient pole 3a and the rotation center of the rotor core 3 and that connecting the other circumferential outline thereof and the rotation center of the rotor core 3 is not less than 100 degrees. Therefore, when an exciting current is supplied to the rotor coil 5, the magnitude and the direction of the electromagnetic torque generated by the exciting current are in accordance with that of the exciting current within the proportional range of the rotor core 3, which is not less than 90 degrees. When no exciting current is supplied to the rotor coil 5, the torque by the permanent magnets 1a and 1b is 0 within the above proportional range.

Figure 7:
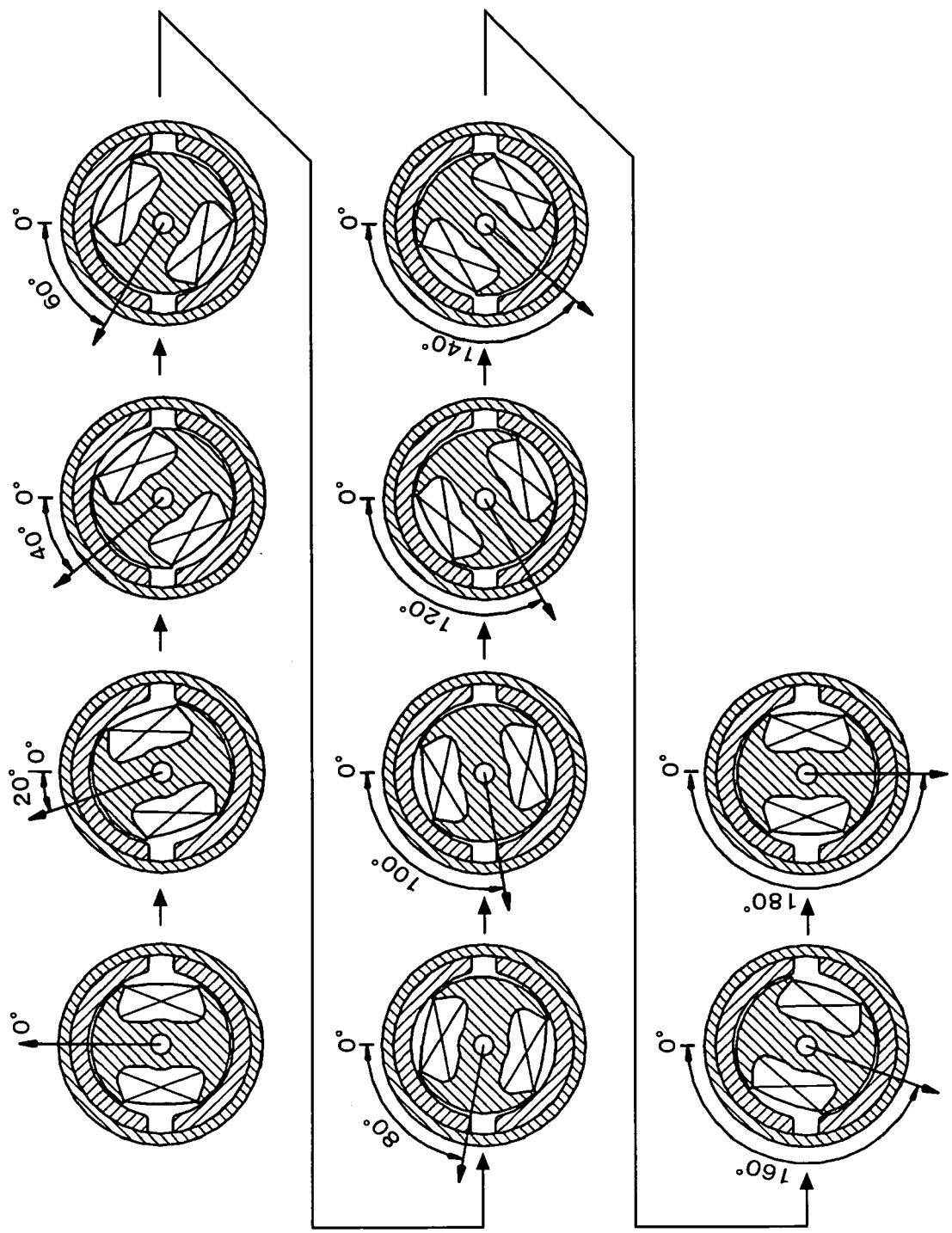
FIG. 7 is a cross-section view showing the rotation of a rotor.

FIG. 7 shows the states in which the rotor core 3 rotates by 20 degrees within a rotation range from "0 degree" to "180 degrees". As described above, the electro-magnetic torque of the rotor core 3 is proportional to the magnitude of the exciting current within the proportional range, which is not less than 90 degrees. Therefore, if the rotor coil is excited by a properly chosen current, the rotor core 3 can be rotated to and held at a freely selected angular position within the proportional range not less than 90 degrees by the opposite torque generated by the opposite torque generating portion B, and the rotor core 3 can be returned to an initial angular position by the opposite torque if the supply of exciting current is stopped.

Figure 10:
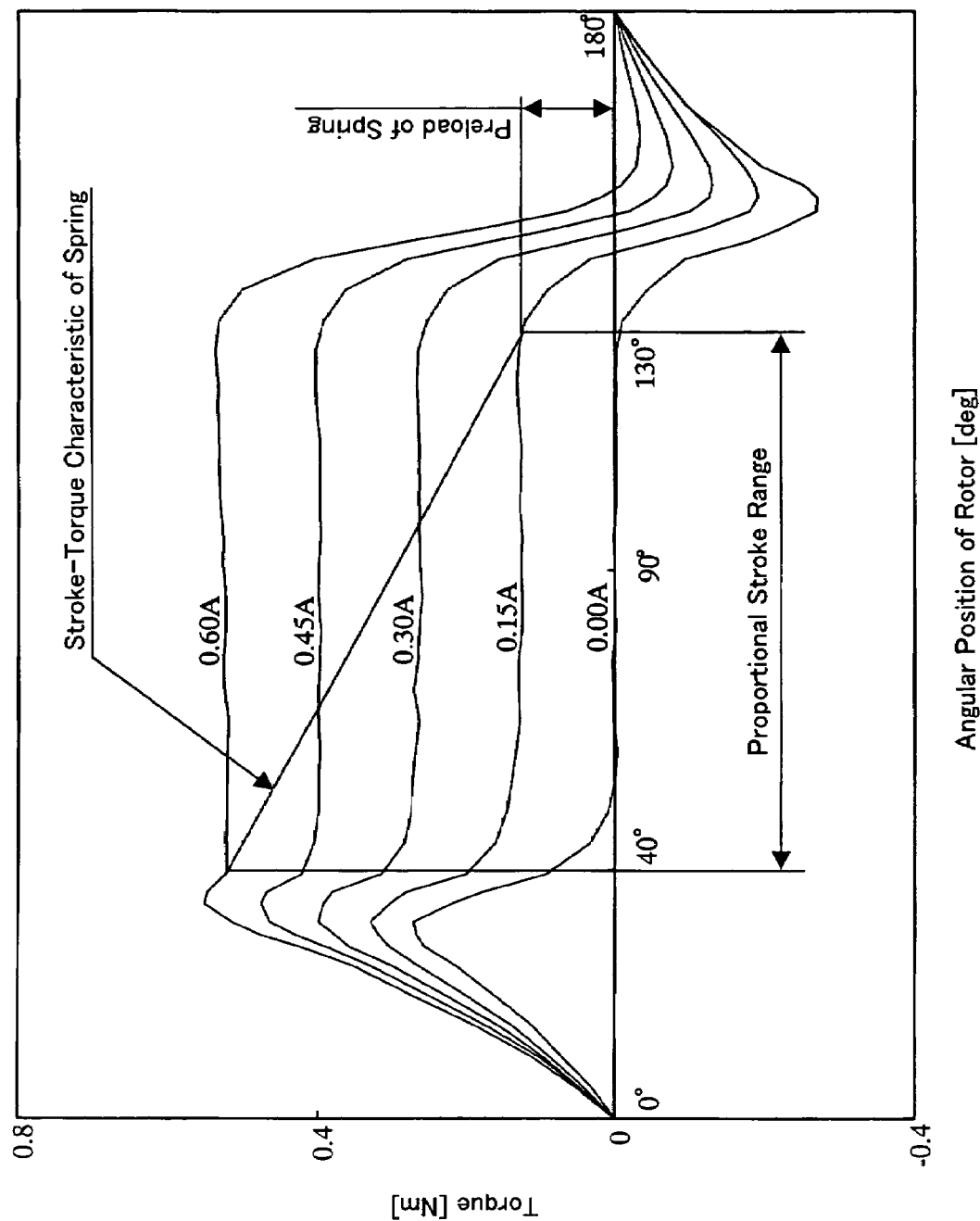
FIG. 10 is a graph showing one example of the relationship among the angular position of a rotor, the electro-magnetic torque and the opposite torque produced by a coil spring in the case in which the magnitude of exciting current varies in the First Embodiment.

As shown in FIG. 10, in the First Embodiment, the magnitude of the electro-magnetic torque is approximately constant corresponding to that of the exciting current within the angular range from "40 degrees" to "130 degrees", that is, within the angular range of 90 degrees. The initial angle position of the rotor core is set at the stroke of "130 degrees" in FIG. 10, which corresponds to the state that the protrusions 31a of the spring ring 31 contact the stoppers 30a and 30b in FIG. 2. When the exciting current is supplied to the coil 5, the rotor core 3 rotates away from the position shown in FIG. 2 toward counterclockwise direction. As shown in FIG. 10, a preload is applied to the coil spring 36 in above initial state, and the opposite torque generated by the coil spring due to the preload approximately equals the electromagnetic torque generated by the exciting current of 0.15 A supplied to the coil 5.

When the supplied exciting current is more than 0.15 A, the electro-magnetic torque generated between the rotor and the stator increases, so that the rotor rotates. The rotation of the rotor is transmitted to the spring ring 31 via the rotor shaft 4 and the spring driving ring 35, the spring ring 31 compresses the coil spring 36, and the opposite torque generated by the coil spring 36 increases along with the increase of the angular displacement of the rotor, so that the rotor stops and is held at an angular position where the electromagnetic torque is balanced by the opposite torque generated by the coil spring 36. In FIG. 10, the opposite torque generated by the coil spring 36 with respect to the angular displacement (stroke) is indicated using a straight line, and intersection points of this line and the electromagnetic torque curves are the angular positions where the rotor stops and is held at exciting current 0.30 A, 0.45 A, 0.60 A, respectively. For example, when the exciting current is 0.60 A, the rotor rotates across 90 (=130-40) degrees.

In the above structured rotary actuator, when an exciting current is supplied to the rotor coil, the electromagnetic torque approximately proportional to the exciting current is generated between the rotor and the stator, which biases the coil spring 36, and the rotor stops rotating at an angular position at which the generated electromagnetic torque corresponds to the opposite torque generated by the coil spring 36. Therefore, the angular displacement of the rotor is approximately proportional to the magnitude of the supplied current, so that angular displacement control in various kinds of mechanical devices can be performed. In the case that this rotary actuator is applied to a valve of a throttle body, the valve can be directly driven, no reduction mechanism is needed, and the angular aperture of the valve can be controlled with high accuracy since it is proportional to the magnitude of the exciting current. For the same reason, a sensing mechanism for sensing the angular aperture of a valve, which has problems in durability, lifetime, and accuracy, is not required too. Since no brush is needed, the durability and the lifetime can be improved. Since no reduction gear mechanism is required, the cost reduction and the reliability can be improved. High electromagnetic torque can be obtained at a low exciting current, and a long period driving can be performed at a high electro-magnetic torque. Since inexpensive magnetic material such as ferrite magnet can be used for the permanent magnet, the cost reduction is possible.

2. Second Embodiment

The Second Embodiment of the present invention will be explained with reference to FIG. 11 to FIG. 13. In a rotary actuator of the Second Embodiment, two spring rings 31 shown in FIG. 8A to FIG. 8C and two spring driving rings 35 shown in FIG. 9A to FIG. 9B are used, so that both rotation directions of a rotor can be controlled. Since the components of the Second Embodiment are the same as that of the First Embodiment, explanation of the components will be omitted, only the assembled state of the components will be explained.

Figure 11:
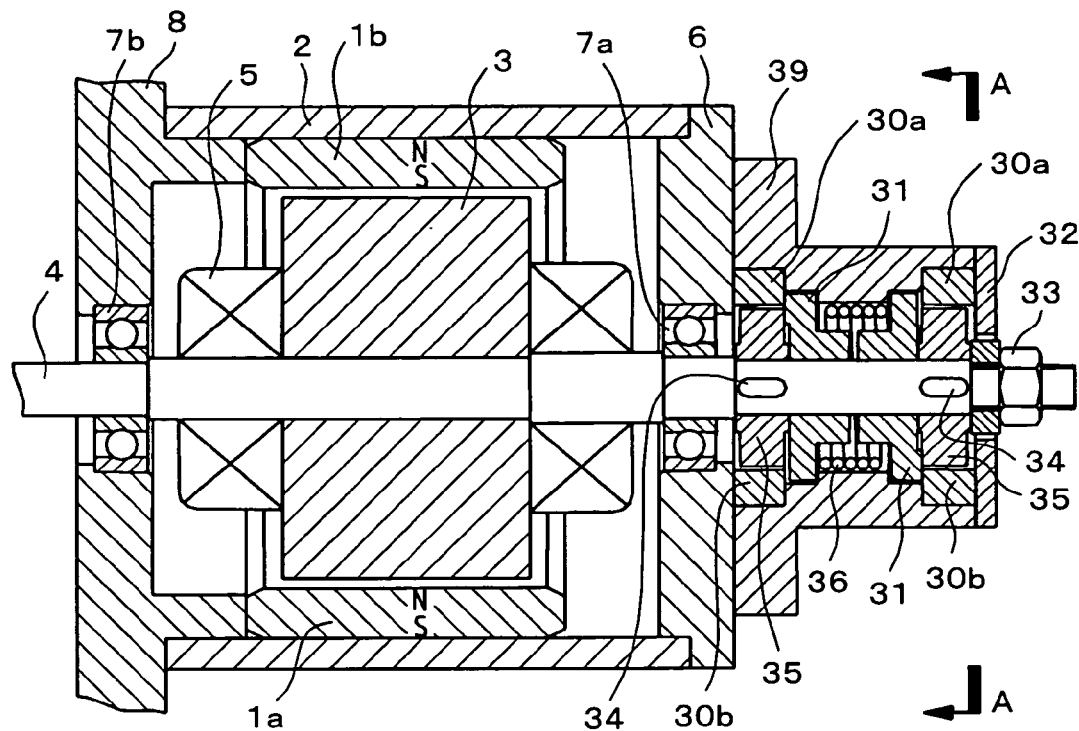
FIG. 11 is a longitudinal-section view showing a structure of a rotary actuator according to the Second Embodiment of the present invention.

As shown in FIG. 11, in the Second Embodiment, two stoppers 30a and 30b are fixed between the holder 6 and the spring housing 39, instead of the spring securing plate 38 of the First Embodiment thereat, and two spring driving rings 35 are fixed on the rotor shaft 4 by the keys 34 inside the internal sides of two pairs of the stoppers 30a and 30b, respectively. Two spring rings 31 are rotatably supported by the rotor shaft 4 next to the spring driving rings 35, so that the rotation locus of the protrusions 31a thereof overlaps with that of the protrusions 35a of the spring driving rings 35. The spring rings 31 and spring driving rings 35 are disposed in the same manner as the First Embodiment. Between the two spring rings 31 there is a space where a coil spring 36 is mounted, and two ends of the coil spring 36 are respectively inserted into the holes 31b of the spring rings 31.

Figure 12:
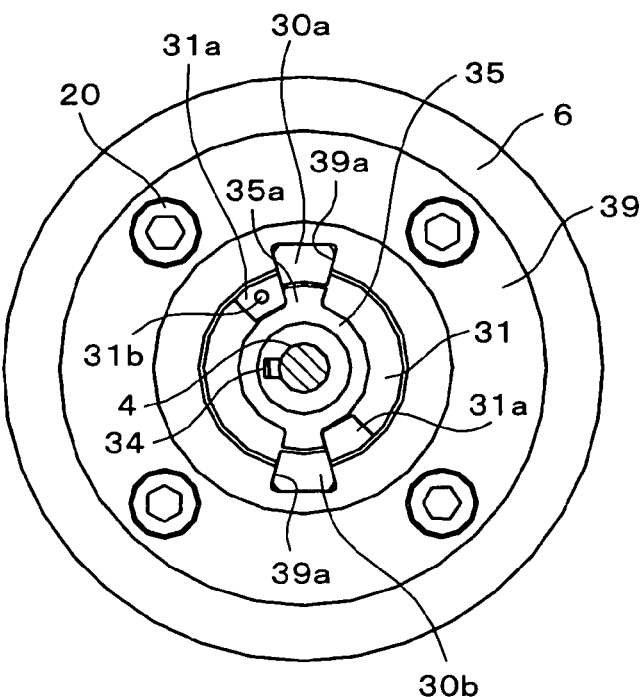
FIG. 12 is a cross-section view in the direction indicated by the arrow A-A in FIG. 11.

As shown in FIG. 12, at the original position, the protrusions 31a of the spring ring 31 on the front side are disposed next to one pair of the stoppers 30a and 30b on their counterclockwise direction sides, and the protrusions 31a of the other spring ring 31 on the rear side are disposed next to the other pair of the stoppers 30a and 30b on their clockwise direction sides.

When the rotor coil 5 is excited by a current, the rotor rotates toward counterclockwise direction in FIG. 12, and it drives the spring driving ring 35 and the spring ring 31 on the front side to rotate together toward the same direction. Although the torque generated in this case is transmitted to the coil spring 36, the spring ring 31 on the rear side does not rotate since its protrusions 31a are stopped by the stoppers 30a and 30b on the rear side. Therefore, the coil spring 36 is compressed by the rotation of the spring ring 31 on the front side.

Figure 13:
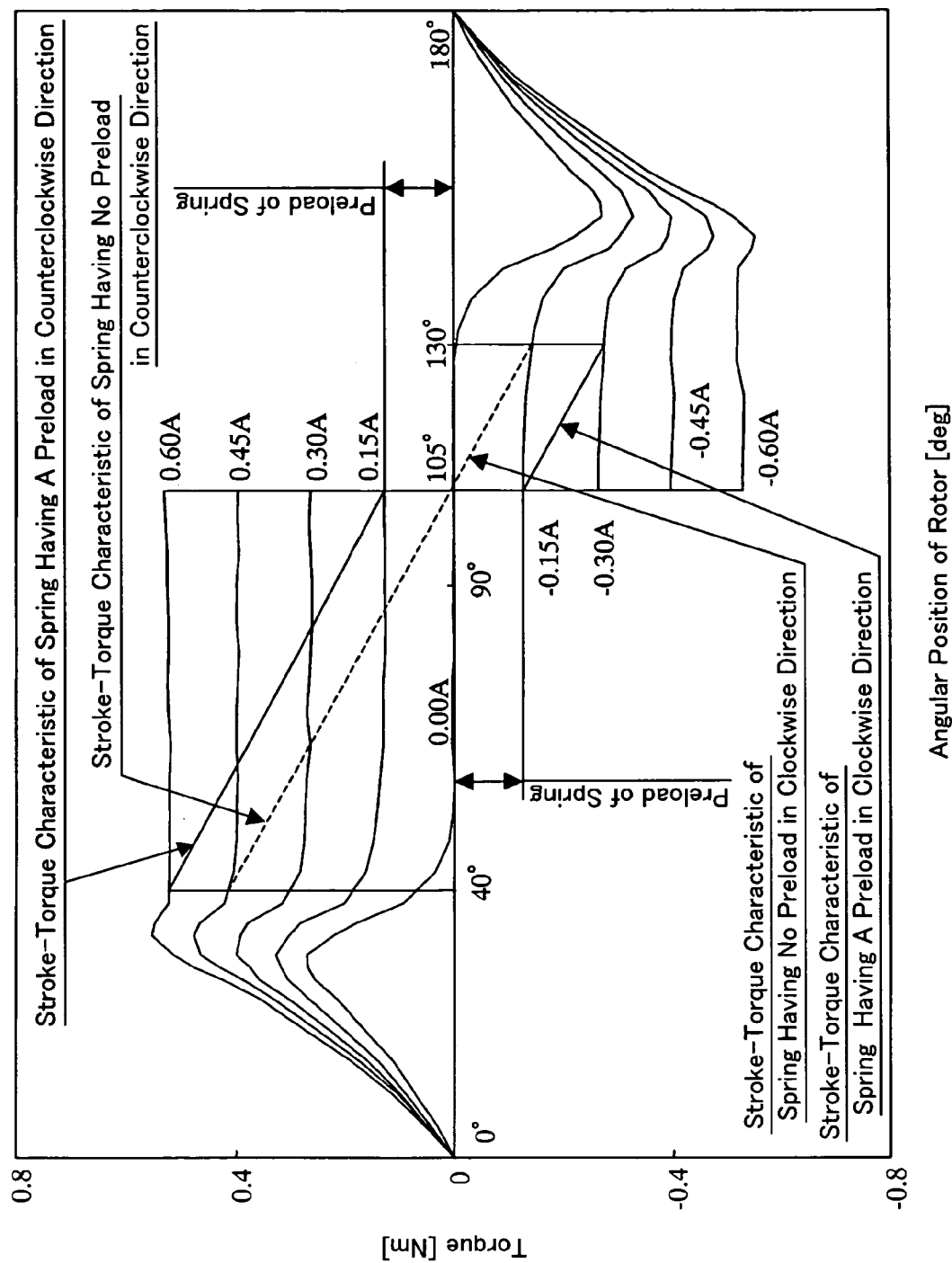
FIG. 13 is a graph showing one example of the relationship among the angular position of a rotor, the electro-magnetic torque, and the opposite torque produced by a coil spring in the case in which the magnitude of exciting current varies in the Second Embodiment.

As shown in FIG. 13, the rotor rotates from the angular position of 105 degrees, where is the original position of the rotor in this case, toward the angular position of 40 degrees. In this Figure, the characteristics of the coil spring with respect to the stroke are shown using solid lines when it is preloaded, and that are shown using dash lines when it is not preloaded. When the rotor rotates towards the above direction, the coil spring 36 is rotated and compressed in the counterclockwise direction viewed from the direction indicated by the arrow A-A in FIG. 11.

When the supply of the exciting current is stopped, the electro-magnetic torque between the rotor and the stator disappears, and the rotor is pushed back to the original position by the opposite torque of the coil spring 36. If the direction of the above exciting current is reversed, the electro-magnetic torque with the direction opposite to the above direction thereof will be generated, so that the rotor rotates toward clockwise direction in FIG. 12, and drives the spring driving ring 35 and the spring ring 31 on the rear side to rotate together toward clockwise direction, while the spring ring 31 on the front side is stopped by the stoppers 30a and 30b on the front side. As a result, the coil spring 36 is rotated and compressed in the clockwise direction viewed from the direction indicated by the arrow A-A in FIG. 11.

In this case, if a preload is applied to the coil spring 36, the rotor starts rotating after the exciting current exceeds 0.15 A, and the angular displacement of the rotor is proportional to the magnitude of the exciting current.

The same actions and effects as that of the First Embodiment can be obtained from the Second Embodiment. Besides, the feature that the angular positioning in either direction can be controlled makes this kind of rotary actuator be more widely applicable.

3. Third Embodiment

The Third Embodiment of the present invention will be explained with reference to FIG. 14 to FIG. 19. This rotary actuator is different from the First Embodiment in that two coil springs with different spring constants are employed.

Figure 14:
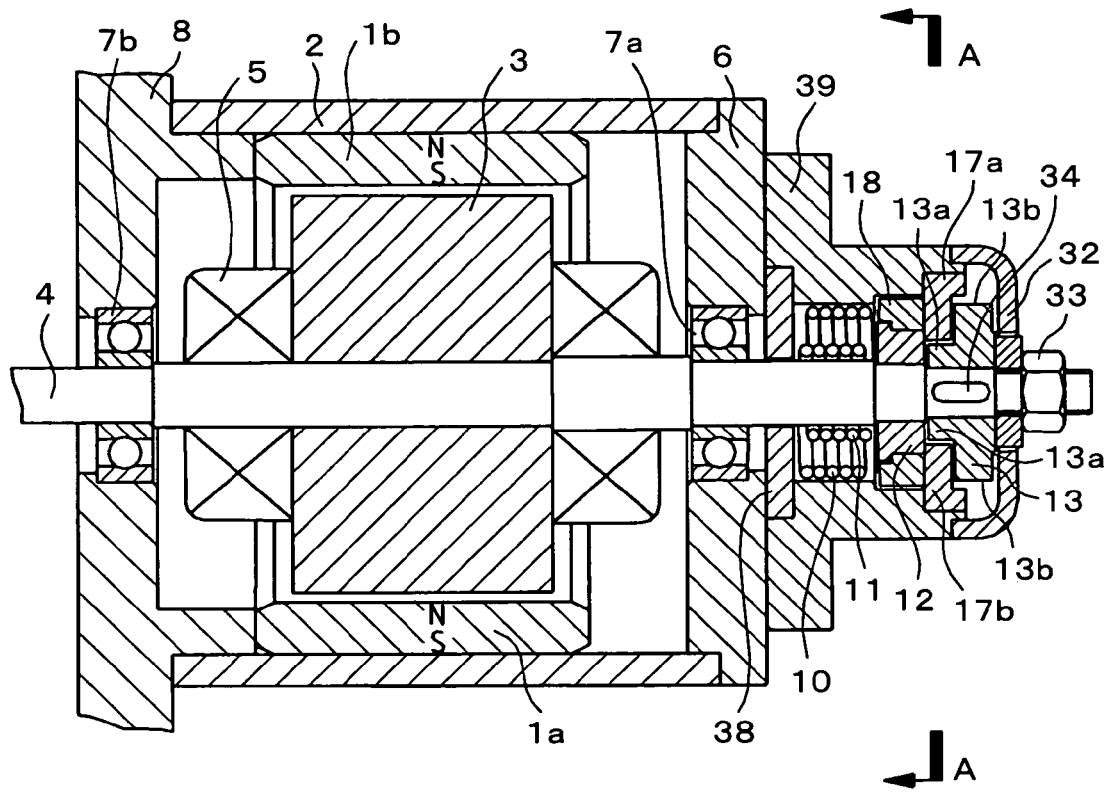
FIG. 14 is a longitudinal-section view showing a structure of a rotary actuator according to the Third Embodiment of the present invention.

As shown in FIG. 14, in the same manner as the First Embodiment, the spring securing plate 38 is fixed between the spring housing 39 and the holder 6 so as to be prevented from the relative rotation. An inner spring ring 12 is rotatably supported by the rotor shaft 4 inside the spring housing 39. The protrusions 12a are formed at one side of the inner spring ring 12 shown in FIG. 17A and FIG. 17B, and spaced 180 degrees apart from each other. A hole 12b penetrates through one of the protrusions 12a. The inner spring ring 12 is rotatably supported by the rotor shaft 4. An inner coil spring (elastic member) 11 is mounted between the inner spring ring 12 and the spring securing plate 38. One end of the inner coil spring 11 is inserted in the hole 12b, and the other end thereof is inserted in the hole (not shown in the FIGS.) formed at the spring securing plate 38.

A peripheral spring ring 18 rotatably rides on the inner spring ring 12. Protrusions 18a are formed at one side of the peripheral spring ring 18 shown in FIG. 16A to FIG. 16C, and spaced 180 degrees apart from each other. A hole 18b penetrates through one of the protrusions 18a. A peripheral coil spring (elastic member) 10 is mounted between the peripheral spring ring 18 and the spring securing plate 38. One end of the peripheral coil spring 10 is inserted in the hole 18b of the peripheral spring ring 18, and the other end thereof is inserted in the hole (not shown in the Figures) formed at the spring securing plate 38.

Figure 15:
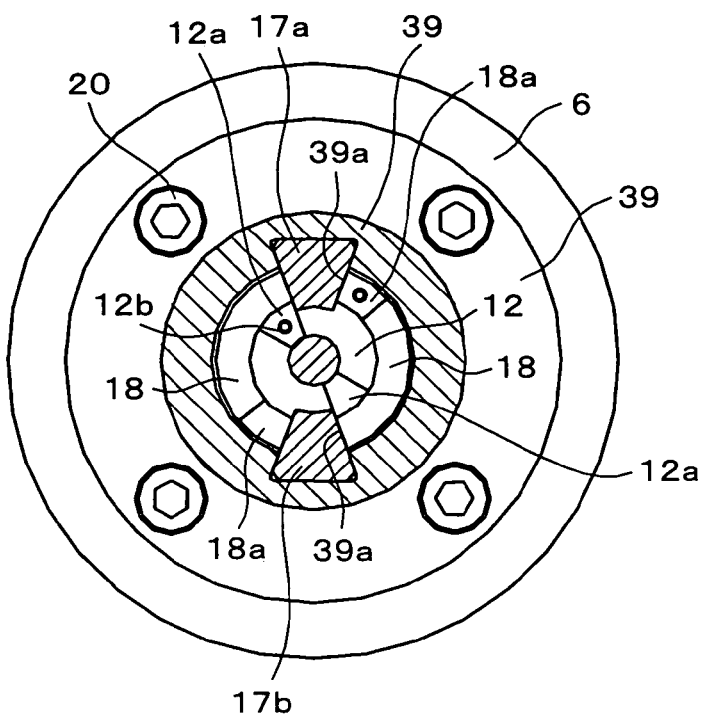
FIG. 15 is a cross-section view in the direction indicated by the arrow A-A in FIG. 14.

Two stoppers 17a and 17b adjacent to the inner spring ring 12 and the peripheral spring ring 18 are disposed inside the spring housing 39, and spaced 180 degrees apart from each other. The stoppers 17a and 17b are fitted into dovetail grooves 39a formed on the inner surface of the spring housing 39. As shown in FIG. 15, the protrusions 12a of the inner spring ring 12 are disposed next to the stoppers 17a and 17b on the counterclockwise direction sides, and the protrusions 18a of the peripheral spring ring 18 are disposed next to the stoppers 17a and 17b on the clockwise direction sides. The protrusions 18a protrude across the stoppers 17a and 17b in the axial direction.

A spring driving ring 13 is mounted at the front of the rotor shaft 4. As shown in FIG. 18A to FIG. 18C, two internal protrusions 13a protruding in the axial direction are formed at the end face of the spring driving ring 13, and spaced 180 degrees apart from each other. Two peripheral protrusions 13b protruding in radial direction are formed at the peripheral portion of the spring driving ring 13, and spaced 180 degrees apart from each other. This spring driving ring 13 is fixed on the rotor shaft 4 by the key 34 such that the internal protrusions 13a are directed toward the inside. In the state shown in FIG. 15, which is viewed from the direction indicated by the arrow A-A in FIG. 14, the internal protrusions 13a are adjacent to the protrusions 12a of the inner spring ring 12 on the clockwise direction sides, and the peripheral protrusions 13b are adjacent to the protrusions 18a of the peripheral spring ring 18 on the counterclockwise direction sides.

In FIG. 15, when an exciting current is supplied to the rotor coil 5, the rotor rotates in clockwise direction, and when the exciting current with the direction opposite to that of the above current is supplied to the rotor coil 5, the rotor rotates in counterclockwise direction. With regard to the structure in FIG. 15, when the rotor shaft 4 rotates in clockwise direction, the peripheral protrusions 13b of the spring driving ring 13 push the protrusions 18a and bring the peripheral spring ring 18 to rotate together, so that the peripheral coil spring 10 is compressed. When the rotor shaft 4 rotates in counterclockwise direction, the internal protrusions 13a of the spring driving ring 13 push the protrusions 12a and bring the inner spring ring 12 to rotate together, so that the inner coil spring 11 is compressed.

Figure 19:
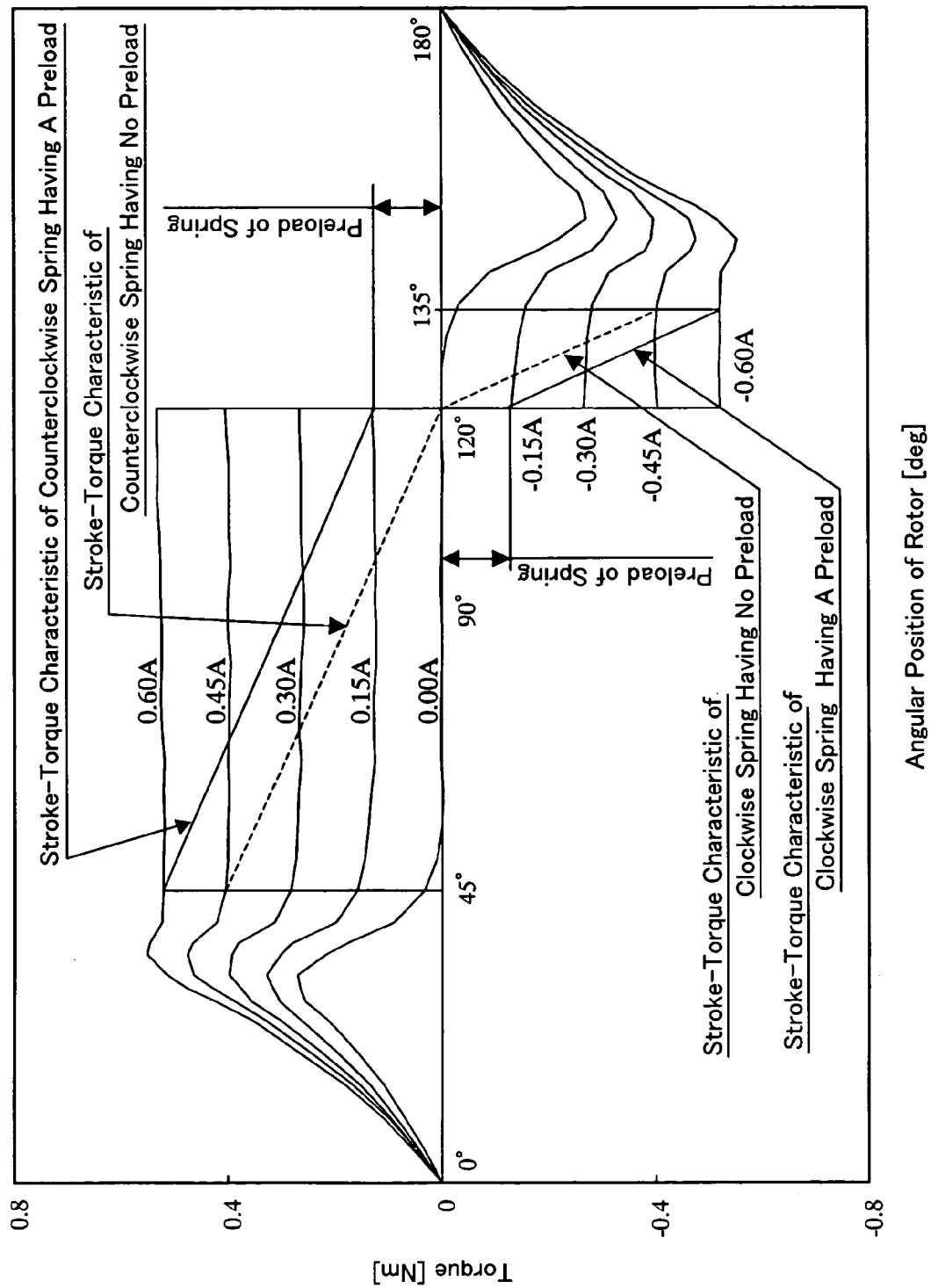
FIG. 19 is a graph showing one example of the relationship among the angular position of a rotor, the electromagnetic torque, and the opposite torque produced by coil springs in the case in which the magnitude of exciting current varies in the Third Embodiment.

As shown in FIG. 19, the original position of the rotor is at the angular position of 120 degrees, and the rotor rotates from the original position to the angular position of 45 degrees. In this Figure, the characteristics of the inner coil spring 11 and the peripheral coil spring 10 with respect to the stroke are shown using solid lines when they are preloaded, and that are shown using dash lines when they are not preloaded. When the rotor rotates in the counterclockwise direction, inner coil spring 11 is rotated and compressed in the same direction, viewed from the front side.

When the supply of the exciting current to rotor coil 5 is stopped, the electro-magnetic torque between the rotor and the stator disappears, and the rotor returns to the original position by the opposite torque of the inner coil spring 11. When the exciting current is supplied in a direction opposite to that of the above current, the electro-magnetic torque with the direction opposite to that of the above electromagnetic torque is generated between the rotor and the stator. In FIG. 15, when the rotor rotates in clockwise direction, it drives the spring driving ring 13 and the periphery spring ring 18 to rotate together toward the same direction, while the inner spring ring 12 is stopped by the stoppers 17a and 17b, so that the peripheral coil spring 10 is rotated and compressed.

Since the spring constant of the peripheral coil spring 10 is larger than that of the inner coil spring 11, as shown in FIG. 19, the angular displacement of the rotor is smaller in comparison with the above case in which the exciting current having the same magnitude is supplied in the opposite direction. Therefore, the control accuracy of this rotary actuator can be changed depending on the rotation direction.

In the above embodiments, in order to make the radial thickness B of the circumferential end portion of each permanent magnet be smaller than the radial thickness A of the circumferential center portion thereof, the facing surface of each permanent magnet facing the rotor core 3 and the opposite surface facing the yoke 2 are formed in the shapes of circular arc surfaces having center positions different from each other. Instead of this, the facing surfaces of the permanent magnets 1a and 1b facing the rotor core 3 may be formed in the shapes of elliptical surfaces. The facing surfaces of the permanent magnets 1a and 1b at the circumferential end portions, which face the rotor core 3, may be formed in the shapes of flat-cut surfaces. Non-magnetic regions may be formed at the circumferential end portions of the permanent magnets 1a and 1b. In this case, the same effects as the case in which the thickness is gradually reduced can be obtained.

In the above embodiments, in order to make the distances from the radial outline of the circumferential center portion of the salient pole 3a to the rotation center of the rotor core 3 be smaller than that from the radial outline of the circumferential end portions of the salient pole 3a to the rotation center of the rotor core 3, the facing surfaces of the rotor core 3, which face the permanent magnets 1a and 1b, are formed in the shapes of circular arc surfaces having the center positions different from each other. Instead of this, the facing surfaces of the rotor core 3, which face the permanent magnets 1a and 1b, may be formed in the shapes of elliptical surfaces. The facing surfaces of the salient poles of the rotor core 3 at the circumferential end portions, which face the permanent magnets 1a and 1b, may be formed in the shapes of flat-cut surfaces.

Although the rotor rotates with respect to the stator in the above embodiments, the present invention can be applied either to a structure in which the stator rotates with respect to the fixed rotor or to the structure in which the rotor and the stator are relatively rotated.

The rotary actuator of the present invention can be applied not only to valves, such as throttle body valves, pressure control valves, proportional bypass valves, but also to various fields, such as rudder control of missiles or vehicles, automatic payment machines, control of laser beam deviation, direction control of parabolic antennas of man-made satellites, direction control of solar power generators, control of automatic tracking apparatuses of cameras.

The invention claimed is:

1. A rotary actuator comprising:
    a stator having plural permanent magnets;
    a rotor having a rotor core which two salient poles are formed at, and one or more rotor coils are wound around;
    an electro-magnetic torque generating portion comprising the stator and the rotor between which electro-magnetic torque is generated by supplying an electric current to the rotor coils, which, in approximate proportion to the magnitude of the electric current, displaces a relative angle position of the rotor and the stator; and
    an elastic member biased in approximate proportion to the magnitude of the relative angle displacement of the rotor and the stator and thereby generating a torque in the direction opposite to the direction of the electro-magnetic torque,
    wherein the permanent magnet having two circumferential end portions and one circumferential center portion, and the radial thickness of the permanent magnet at the circumferential end portions being smaller than the radial thickness of the permanent magnet at the circumferential center portion,
    wherein the distance from the radial outline of the circumferential center portion of the salient pole to the rotation center of the rotor core being smaller than the distance from the radial outline of the circumferential end portions of the salient pole to the rotation center of the rotor core, and
    wherein the angle between the line connecting one of circumferential outlines of a salient pole and the rotation center of the rotor core and the line connecting the other circumferential outline of the same salient pole and the rotation center of the rotor core being an obtuse angle.

2. A rotary actuator according to claim 1, the actuator further comprising:
    an elastic member driving device rotating together with the rotor or the stator when the rotor or the stator rotates in a predetermined rotation direction and thereby biasing the elastic member.

3. A rotary actuator according to claim 1, wherein the elastic member is biased beforehand by applying a preload to the elastic member.

4. A rotary actuator according to claim 1, wherein the actuator is structured such that:
    the stator having two permanent magnets;
    the rotor core having two salient poles;
    the permanent magnet having two circumferential end portions and one circumferential center portion, the radial thickness of the circumferential end portion being from 90% to 95% of the radial thickness of the circumferential center portion;
    the distance from the radial outline of the circumferential center portion of the salient pole to the rotation center of the rotor core being not more than 99% of the distance from the radial outline of the circumferential end portion of the salient pole to the rotation center of the rotor core; and
    the angle between the line connecting one of circumferential outlines of a salient pole and the rotation center of the rotor core and the line connecting the other circumferential outline of the same salient pole and the rotation center of the rotor core being not less than 100 degrees.

5. A rotary actuator according to claim 1, wherein the rotor core and the permanent magnet have facing surfaces facing each other, the facing surfaces of the rotor core and the permanent magnet formed in the shapes of circular arc surfaces of which center positions are different from each other.

6. A rotary actuator according to claim 1, wherein the permanent magnet has a facing surface facing the rotor core, the facing surface formed in the shape of an elliptical surface.

7. A rotary actuator according to claim 1, wherein the permanent magnet has a facing surface facing the rotor core and has two circumferential end portions, the facing surface at the circumferential end portion formed in the shape of a flat-cut surface.

8. A rotary actuator according to claim 1, wherein the rotor core has two facing surfaces respectively facing the two permanent magnets, each of the facing surfaces of the rotor core formed in the shape of a plurality of circular arc surfaces of which center positions are different from each other.

9. A rotary actuator according to claim 1, wherein the rotor core has two facing surfaces respectively facing the permanent magnets, each of the facing surfaces formed in the shape of an elliptical surface.

10. A rotary actuator according to claim 1, wherein the rotor core has two facing surfaces respectively facing the two permanent magnets, the facing surface at a circumferential end portion of the salient pole formed in the shape of a flat-cut surface.

11. A rotary actuator according to claim 1, wherein the permanent magnet has two circumferential end portions, each of which has a non-magnetized region formed thereat.

* * * * *